May 30, 1967 G. K. ROSENDAHL 3,321,820
APPARATUS FOR GEAR BURNISHING
Filed July 20, 1965

INVENTOR.
Guenter K. Rosendahl
BY
His Att'ys

United States Patent Office 3,321,820
Patented May 30, 1967

3,321,820
APPARATUS FOR GEAR BURNISHING
Guenter K. Rosendahl, Chicago, Ill., assignor to Illinois Tool Works Inc., Chicago, Ill., a corporation of Delaware
Filed July 20, 1965, Ser. No. 473,391
6 Claims. (Cl. 29—90)

ABSTRACT OF THE DISCLOSURE

Apparatus for removing minor gear tooth defects by burnishing prior to inspection wherein the work gear to be burnished is rolled in mesh with a plurality of burnishing gears at least one of which is powered. At the completion of the burnishing operation, one of the gears other than the powered driving gear has its rate of rotation relative to the driving gear changed to cause the work gear to be moved out of mesh with the plurality of burnishing gears.

This invention relates to method and apparatus for processing of gears and more particularly relates to method and apparatus for removing irregularities on gear tooth surfaces.

In general use are electronic gear checking or gear inspecting machines which determine gear accuracy by meshing and rolling a gear with a master gear of established accuracy. Deviation from the master gear pattern are noted and recorded for such factors as tooth spacing errors and involute inaccuracies which become apparent variations between centers of the gear being tested and the master gear. A portion of the errors are due to small nicks and to minor bumps caused by heat treatment scale, chips, scratches, burrs and foreign particles including dust particles which cling to the teeth surfaces. Such particles may produce test readings of sufficient magnitude to effect a subsequent rejection of the gear during testing even though there are no errors basic to gear accuracy and suitability.

Accordingly, it is an object of this invention to provide method and apparatus for reducing the adverse test results ascribable to minor inaccuracies in the gear tooth surfaces which inaccuracies can be eliminated easily without affecting the proper functioning of the gear under service conditions.

A further object is to provide method and apparatus for eliminating or substantially reducing errors of minor sorts caused by surface scale, small chips, minor scratches and foreign particles.

A further object is to reduce the rejection rate of gear testing procedures and thereby increase the speed and efficiency of gear testing machines.

These and related objects are achieved by the present invention wherein tooth surfaces of the gear are engaged in such a manner as to burnish the surfaces and thereby reduce or remove minor irregularities before the gear is subjected to inspection testing.

Figure 1:
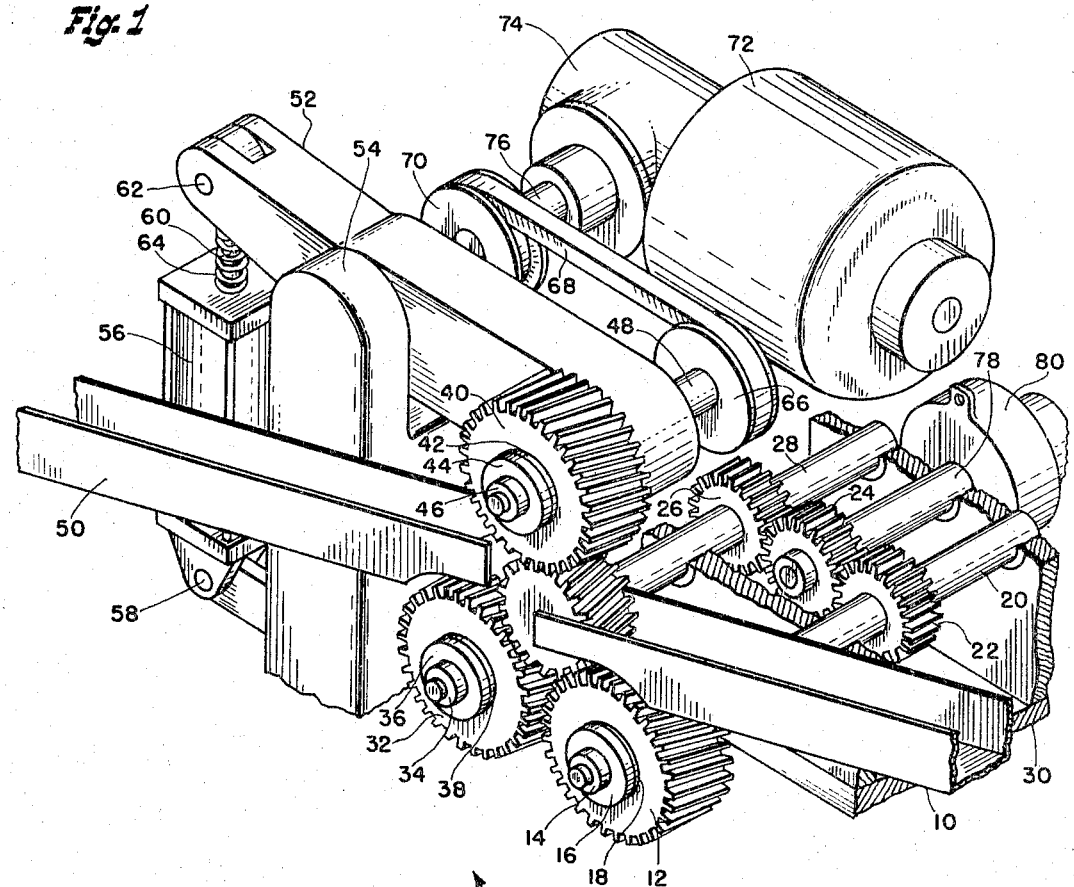
Figure 2:
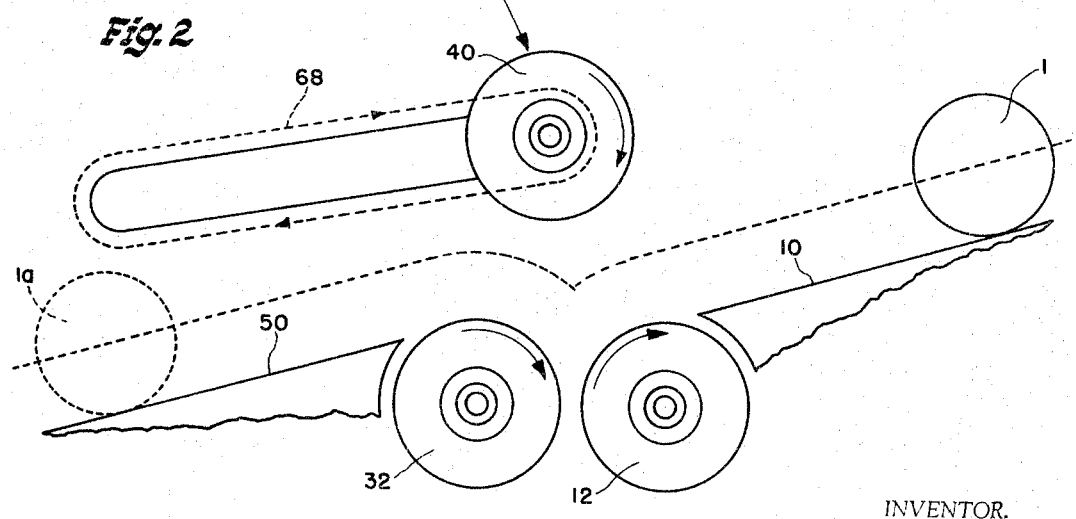

Further description of the invention can be had by reference to the drawings in which FIG. 1 is a top perspective view of the burnishing device of the invention and FIG. 2 is a schematic diagram of the device and method of presenting gears for burnishing, burnishing the gears, and then removing them from the burnisher to present them to a subsequent handling or testing procedure.

With reference to FIG. 1, feed chute 10, substantially inclined to the horizontal, terminates at its lower end above driven gear 12, the axis of feed chute 10 being essentially normal to the axis of driven gear 12. The process of burnishing as practiced by this invention comprises bringing gears to be tested successively from a gear supply through feed chute 10 which may be lined with suitable cushioning material such as rubber to protect the gears as they enter and roll through the chute. When feed chute 10 contains more than one gear, a gate or releasing stop mechanism is included at some point along the length of chute 10 above the point at which gear 1 engages driven gear 12 so that the gears are received by the burnisher one at a time.

The apparatus is intended only to burnish gear tooth surfaces by briefly running the gears under load conditions and is not for the purpose of testing for tooth errors. Accordingly, there is no absolutely rigid mounting of the three gears which perform the burnishing. With a measure of flexibility in the mountings it is possible for the apparatus to receive gears to be burnished which may have tooth errors of a rather substantial sort. Consequently, driven gear 12 is mounted by retaining nut 14 and shoulder disc 16 through shoulder disc pad 18 of pliable resilient material such as rubber, a similar shoulder disc pad being used on the reverse or hidden side of driven gear 12 to cooperatively provide a flexible mounting of driven gear 12 on idler shaft 20. Such mounting may be done in the manner described in U.S. 3,115,712. Toward the other end of idler shaft 20 is idler gear 22 meshed with intermediate gear 24 which, in turn, is meshed with idler gear 26 on idler shaft 28. All three idler gears 22, 24 and 26 are identical and are maintained in meshing engagement by shaft bearing mountings in housing 30 which also supports a solenoid brake controlling the speed of intermediate gear 24 for a purpose to be subsequently described.

In the same manner described for the mounting of driven gear 12, driven gear 32 is mounted on idler shaft 28 by means or retaining nut 34, shoulder disc 36 and resilient shoulder disc pad 38. Positioned above and in parallel axis relationship with driven gears 12 and 32 is driving gear 40 shown mounted by means of similar shoulder disc pad 42, shoulder disc 44 and retaining nut 46 on driving gear shaft 48. However, rigid mounting driving gear 40 is satisfactory, alignment being accomplished by flexibility in the mounting of driven gears 12 and 32. With these means and by a method to be further described, test gear 1 is brought into simultaneous mesh with driving gear 40 and driven gears 12 and 32 and while in mesh under pressure is caused to turn through several rotations before being raised and released from meshing engagement to be moved into exit chute 50 for testing and further handling.

Overarm 52 is so constructed as to pivot at a point along its length on a pin mounted in post 54. In operation, overarm 52 is reciprocally actuated by fluid cylinder 56 pivotally mounted at its base through pin 58 to permit the upper end of rod 60 to move in the arc made by pin 62 in overarm 52. Spring 64 serves as a biasing means to provide a minimum upward pressure acting as a minimum downward pressure at the other end of overarm 52 carrying driving gear 40 in mesh with gear 1 until it is discharged from the burnisher.

Driving the driving gear shaft 48 is a movable system comprising driven pulley 66, belt 68 and drive pulley 70 which is representative of other suitable systems that would permit constant torque transmission to driving gear 40 while overarm 52 is pivoted through a series of positions. Providing power is motor 72 through speed reducer 74 by means of shaft 76, a suitable speed for shaft 76 being on the order of 75 to 100 r.p.m. where this speed is essentially maintained in driving gear 40.

In a burnishing cycle, which can be of any chosen length of time but which can be conducted in a six second cycle which includes loading and unloading of the gear, gear 1 as shown in FIG. 2, moves downwardly through feed chute 10 tangentially over the top of driven gear 12 and into the valley formed above and between driven gears 12 and 32. Overarm 52 under the minimum downward pressure mentioned, forces driving gear 40, which is constantly rotating, to engage gear 1. With the downward pressure exerted upon it gear 1, in turn, is forced into meshing engagement with driven gears 12 and 32 if meshing has not already occurred, the shafts of these driven gears being synchronized by means of the gear train described earlier which angularly positions both gears for concurrent tooth engagement with gear 1. Sufficient backlash is provided to give the required amount of relative angular tooth displacement necessary for rapid, smooth engagement and disengagement with gear 1. Burnishing is accomplished following actuation of fluid cylinder 56 to raise rod 60 and thereby place an additional downwardly directed force on driving gear 40 producing a pressure loading on gear 1.

After burnishing is completed, the amount of time being variable but capable of being accomplished in a meshing engagement on the order of three to four seconds at the stated speeds, the idler gears 22 and 26 are slowed in their rotation by intermediate gear 24 on shaft 78 controlled by solenoid brake 80 as seen in FIG. 1. Returning to FIG. 2, it can be seen that the resultant slowing of driven gears 12 and 32 while maintaining a constant speed of rotation in driving gear 40 results in driving gear 40 pulling gear 1 out of the valley formed by the two driven gears 12 and 32 whereby gear 1 is first disengaged from gear 12. The higher rotational speed of drive gear 40 in relation to the slowed speed of driven gear 32 proceeds to raise gear 1 moving it while in mesh circumferentially around driven gear 32 to a point where it falls from meshing engagement with both driving gear 40 and driven gear 32. At that point it is free to move downwardly through exit chute 50 through the position represented by gear 1a. Driving gear 40 is positioned on the exit chute side of a vertical line intermediate driven gears 12 and 32 to enable gear 1 to be discharged without any additional assistance. In order to accomplish this, gear 1 is raised and moved sufficiently beyond the vertical diameter of driven gear 32 so that its motion and weight will carry it into exit chute 50.

A gate or other releasing stop mechanism at some point along the length of feed chute 10 may be actuated by the lift motion of overarm 52 at the moment when it is released from engagement with gear 1, the following gear to be burnished thereupon being permitted to enter into triangular engagement with driven gears 12 and 32 and descending driving gear 40.

It is to be appreciated that a burnishing apparatus of the type described is designed for large volume burnishing of gears of essentially identical design and dimensions. A change in the type of gear to be burnished will in almost all instances require removal and replacement of driving gear 40 and driven gears 12 and 32 to cause them to correspond with the changed gear type. Although the burnishing apparatus has been described in relation to identical or essentially identical gears serving as driving and driven gears, it can be seen that only identical tooth spacing is necessary on gears which can otherwise be of different sizes so long as a triangular engagement of the gear being burnished can be obtained. Any such change in relative sizes of these three gears will, of course, require changes in relative locations of the gears. In addition, to assure a burnishing of the entire tooth surface, the face width of the driving and driven gears must be greater than the face width of the gear being burnished so that tooth contact occurs over the entire width of the gear while it is in engagement.

By changing the relative positions and directions of rotation of the gears it is possible to apply power to the lower gear adjacent the exit chute making the uppermost gear a driven gear thereby moving the gear being burnished out of engagement and into the exit chute. In any arrangement it is the relative rates of rotation of the drive gear and driven gear closest to the exit chute which moves the burnished gear out of mesh and discharges it.

With the many modifications both mentioned and implicitly present, there is no intention to limit the scope of the invention except as indicated in the following claims.

I claim:

1. Apparatus for burnishing gears which comprises a plurality of gears having tooth forms and tooth spacing adapted to mesh with a gear to be burnished, said plurality of gears being in substantinally parallel axes relation, one of said plurality of gears being a drive gear, means for applying a load to at least one of said plurality of gears and means for changing the relative rates of rotation between said drive gear and the rest of said plurality of gears whereby the gear being burnished is moved out of mesh with said plurality of gears.

2. Apparatus for burnishing gears which comprises three gears having tooth forms and tooth spacing adapted to mesh with a gear to be burnished, said three gears being in substantially parallel axes relation, one of said three gears being a drive gear, means for applying a load to at least one of said three gears and means for changing the relative rates of rotation between at least two of said three gears whereby the gear being burnished is moved out of mesh with said three gears.

3. Apparatus for burnishing gears which comprises a plurality of gears having tooth forms and tooth spacing adapted to mesh with a gear to be burnished, said plurality of gears being in substantially parrallel axes relation flexibly mounted to permit nominal axial deviations, one of said gears being a drive gear, means for applying a load to at least one of said plurality of gears and means for changing the relative rates of rotation between said drive gear and the rest of said plurality of gears whereby the gear being burnished is moved out of mesh with said plurality of gears.

4. Apparatus for burnishing gears which comprises a plurality of gears having tooth forms and tooth spacing adapted to mesh with a gear to be burnished, said plurality of gears being in substantially parallel axes relation, one of said plurality of gears being a drive gear, means for presenting gears to be burnished singly into meshing engagement with said plurality of gears, means for applying a load to at least one of said plurality of gears and means for changing the relative rates of rotation between said drive gear and the rest of said plurality of gears whereby the gear being burnished is moved out of mesh with said plurality of gears.

5. Apparatus for burnishing gears according to claim 4 in which said means for presenting gears to be burnished is a gravity feed means.

6. Apparatus for burnishing gears which comprises three gears including a drive gear and a pair of driven gears having tooth forms and tooth spacing adapted to mesh with a work gear to be burnished, said three gears being in substantially parallel axes relation and flexibly mounted to accommodate minor tooth errors in the work gear to be burnished, power means for rotating said drive gear, first gravity feed means for presenting work gears to be burnished singly into meshing engagement with said three gears, loading means for applying pressure to one of said three gears, and brake means for retarding the movement of at least one of said driven gears at the completion of a burnishing operation to cause a change in the relative rate of rotation between said drive gear and said at least one driven gear and thereby lift the work gear out of engagement with said driven gears and into a second gravity feed means for movement away from said three gears.

References Cited

UNITED STATES PATENTS 1,576,806   3/1926   Blood _____ 29—90.90

RICHARD H. EANES, Jr., *Primary Examiner.*

JOHN F. CAMPBELL, *Examiner.*